United States Patent [19]

Ohki et al.

[11] Patent Number: 5,302,872
[45] Date of Patent: Apr. 12, 1994

[54] LINEAR MAGNETIZATION MOVER MOTOR DUE TO LINEAR FORCE RESULTING FROM THE INTERACTION BETWEEN MAGNETOSTATIC INDUCTION ELEMENT AND ELECTROMAGNETIC COIL

[75] Inventors: Yasutsugu Ohki, c/o Railway Technical Research Institute, 8-38, Hikari-cho 2-chome, Kokubunji-shi, Tokyo; Shin-ichi Hase, Kokubunji; Hiroyasu Toda, Kokubunji; Kouichi Matsuoka, Kokubunji; Tetsuo Uzuka, Kokubunji, all of Japan

[73] Assignees: Railway Technical Research Institute; Yasutsugu Ohki, both of Tokyo, Japan

[21] Appl. No.: 909,668

[22] Filed: Jul. 7, 1992

[30] Foreign Application Priority Data

Jul. 9, 1991 [JP] Japan .................................. 3-194793

[51] Int. Cl.$^5$ ............................................. H02K 41/00
[52] U.S. Cl. ...................................................... 310/12
[58] Field of Search ...................................... 310/12, 14

[56] References Cited

U.S. PATENT DOCUMENTS

| | | | |
|---|---|---|---|
| 3,697,908 | 10/1972 | Highsmith | 335/209 |
| 3,869,625 | 3/1995 | Sawyer | 310/12 |
| 4,839,543 | 6/1989 | Beakley et al. | 310/12 |
| 4,965,864 | 10/1990 | Roth et al. | 318/135 |
| 4,973,892 | 11/1990 | Murata et al. | 318/135 |
| 5,128,569 | 7/1992 | Gladish | 310/12 |

FOREIGN PATENT DOCUMENTS

| | | |
|---|---|---|
| 0040509 | 11/1981 | European Pat. Off. . |
| 0425314 | 5/1991 | European Pat. Off. . |
| 139768 | 9/1901 | Fed. Rep. of Germany . |
| 2243622 | 3/1972 | Fed. Rep. of Germany . |
| 2229711 | 1/1974 | Fed. Rep. of Germany . |
| 811328 | 4/1937 | France . |
| 50-79953 | 11/1948 | Japan . |

OTHER PUBLICATIONS

"The Present State and the applied Technology of the Linear Electromagnetic Driving System," Institute of Electrical Engineers of Japan, Sec. 2, No. 314, pp. 3-7 date unknown.
"Linear Motors and Their Applications," Institutes of Electrical Engineers, pp. 2-33 date unknown.
"Linear Motor for Industry," Kogyo chosakai Publishing Company, Limited, pp. 193-197 date of publication unknown.
Patent Abstract of Japan, vol. 10, No. 75 (E-390) (2132) Mar. 25, 1986 of Japanese Patent No. 60-219958 dated Nov. 2, 1985.
European Search Report dated Sep. 3, 1992 with Communication from the European Patent Office dated Sep. 28, 1992.

Primary Examiner—Steven L. Stephan
Assistant Examiner—Judson H. Jones
Attorney, Agent, or Firm—Finnegan, Henderson, Farabow, Garrett & Dunner

[57] ABSTRACT

A linear motor has a mover that is a magnetostatic induction element and is relatively movable through electromagnetic coils or the like. The mover has a length of a magnetic path which derives attraction from the coil in regard to the length of the electromagnetic coil. As the magnetostatic induction element proceeds through the electromagnetic coils, the electromagnetic coils are energized while the magnetic field created thereby exert forward attractive force on the magnetostatic induction element, and disenergized before the traction in a reverse direction is exerted on the magnetostatic induction element.

21 Claims, 6 Drawing Sheets

LINEAR MAGNETIZATION MOVER MOTOR DUE TO LINEAR FORCE RESULTING FROM THE INTERACTION BETWEEN MAGNETOSTATIC INDUCTION ELEMENT AND ELECTROMAGNETIC COIL

BACKGROUND OF THE INVENTION

1. Field of the Invention

The present invention relates to a linear motor used for conveying objects or a linear motion devices in industry, and in particular, relates to a linear magnetization mover motor due to linear force resulting from the interaction between a magnetostatic induction element and electromagnetic coils.

2. Related Art

According to "The Present State and the applied Technology of the Linear Electromagnetic Driving System" that is a technical report of the Institute of Electrical Engineers of Japan [Section 2], No. 314, linear electromagnetic actuators classify two groups; linear motors obtainable by developing rotary motors cut open in a straight line; and the other is linear actuators, which are called linear motion oscillators, and is limited to a certain extent of motion in itself. According to the definition, the linear motors, i.e., linear induction motors, linear synchronous motors, linear pulse motors, linear direct current motors, or linear hybrid motors that are combinations of other types of linear motors, or the like, have a linear driving force interactive between a current filament and a traveling magnetic field, instead of the rotating field at the rotating machines. The linear actuators, such as electromagnetic pumps or the like, which generate linear attractive force within a limited range of motion are not included in the linear motors. According to other documents, an electromagnetic gun for accelerating a projectile under Fleming's left hand rule is also categorized as an apparatus for creating linear propulsive and attractive force.

Figure 10:
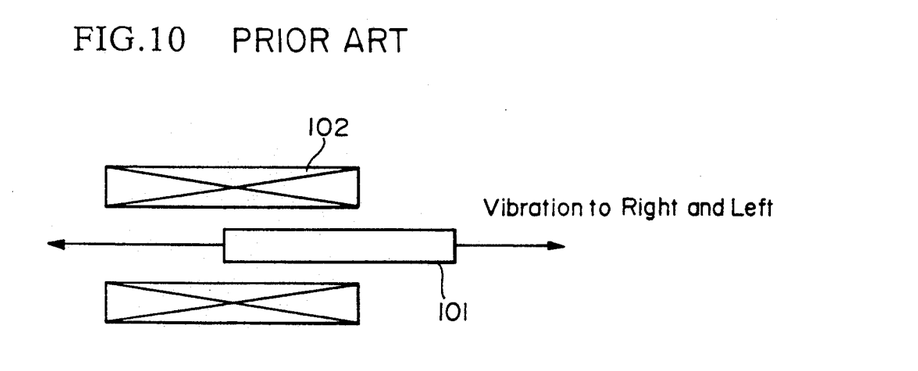
FIG. 10 shows the relationship between an electromagnetic coil and a movable plunger in a conventional of magnetic leakage type.

FIG. 10 shows an example of a conventional magnetic leakage type of a linear electromagnetic solenoid actuator having an electromagnetic air-core coil 102 and a movable plunger 101, which is limited to a certain extent of motion in itself. Such an actuator is described on page 27 of "Linear Motor and Their Application" which is edited by the Institutes of Electrical Engineers and published by Ohmsha LTD.

The above linear electromagnetic actuators use electromagnetic attraction or repulsive force resulting from the interaction between a current filament (or a magnetic element) and a magnetic field.

In the linear motors according to the present invention wherein electromagnetic air-core coil, ferromagnetic core coil or the like and movable element are employed, magnetizable materials made by an induced magnetization from a magnetostatic field is used instead of the current or the magnet that are used in the linear electromagnetic actuators described above.

The technical report of Electrical Society [Section 2], No. 314 discloses a linear oscillatory actuator which is a linear actuator exerting linear reciprocation on a movable member by electrical input without using any converter; and a linear electromagnetic solenoid which is a component giving linear motion directly to a movable iron core by the electromagnetic force which is exerted on an exciting coil by application of voltage. Japanese Utility Model Application Kokai (Laid-Open) No. 50-79953 discloses a digital solenoid comprising a movable iron core which can be linearly moved through a cylindrical exciting coil by exciting the coil. "Linear Motor for Industry"; edited by Hajime Yamada and published by Kogyo chosakai Publishing Company, Limited, discloses a linear digital actuator. Each of the above-described actuators, however, has a limited stroke, therefore, is different from the present invention that is a linear motor with electromagnetic air-core coil and has a magnetic induction element that is an electromagnetic air-core coil according to which enables continuous linear propulsion of objects.

Figure 11:
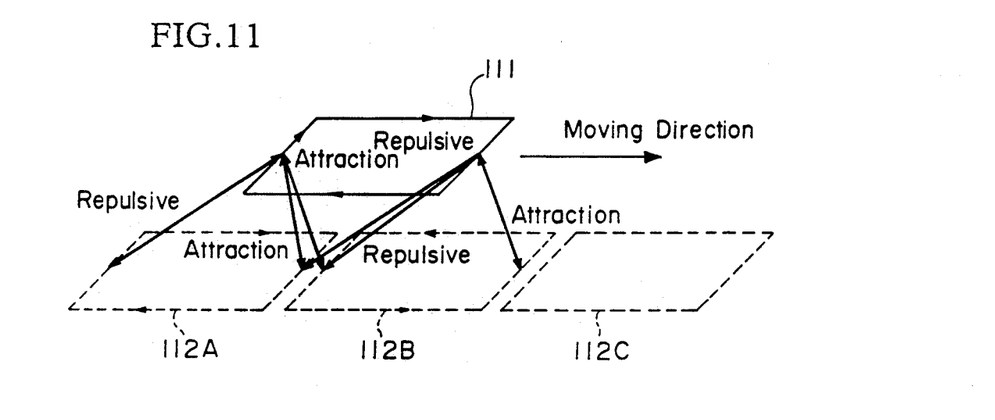
FIG. 11 is a view showing the function relationship between a moving object 111 and ground coils 18-A, 18-B, 18-C, . . . and 18-N using conventional functions of attraction and repulsive forces.

Since the conventional linear motor is obtained by developing a rotary motor cut open in a straight line, in a direction of motion thrust, propulsion force and traction force result from interaction between a current filament and traveling magnetic field intensity. The forces have the direction mutually perpendicular to the traveling magnetic field and the current. FIG. 11 schematically shows attraction and repulsive forces acting between the mover (a magnet or an electromagnetic coil) 111 and ground coils 112-A, 112-B, 112-C, ..., and 112-N, according to a conventional construction. As shown in the figure, when the mover of a current loop (or magnetic poles) and the other current loop (the magnetic poles of magnets) face to each other, the attractive force exerted on the mover is zero to the direction of thrust and propulsion, and when the half overlapping condition both the current loop and the other current loop, the mover receives a largest transversal force. Therefore, the linear driving force exerted on the mover varies as the object travels along the track or the magnitude of traveling magnetic field. It is possible to create a continuous magnetic field by disposing the magnets to overlap with one another. However, this solution will make necessary a complex structure.

The magnetic field that issues from the excitation of electromagnetic coil has the maximum intensity at the center of the coil and the intensity gradually decreases according to the distance from the center. Therefore, the closer to the center of the coil, the more intensive the magnetic field. Accordingly, it is necessary to locate interacting magnets, the magnetostatic magnet and magnet (or a current filament), as close as possible to each other to economize the magnetic energy. However, according to the conventional linear motor, the mover (or a magnet, current filament) is not always located where magnetic field has the greatest magnetic intensity as clearly shown in FIG. 11. Therefore, such a conventional structure requires a large electric current to obtain necessary attractive force The driving force is produced by the vector product of the magnetic field intensity and the current intensity of the mover. Other problems in conventional linear motors are that a high-powered permanent magnet, an exciting power supply and coils for producing a high-powered electromagnet, a cooling device, a power supply for cooling, and an exciting circuit therefor is required.

SUMMARY OF INVENTION

The present invention was developed in view of the above problems in conventional apparatus.

An object of the present invention is to provide a linear motor that enables effective utilization of the magnetic field generated by the electromagnetic coil to accumulate an attraction force on a magnetizable induction element.

Another object of the present invention is to provide a linear motor in which a magnetizable induction element such as a cylindrical tube or the like receives an attraction force only in the direction of motion of the mover (called simply as a magnetizable cylindrical tube or a hybrid configuration between the tube and permanent magnet, or electromagnetic coil, superconductive magnet hereinafter).

Further object of the present invention is to provide a linear motor having a simple structure and generates a magnetostatic field along the direction of motion In order to achieve the above objects of the present invention, there is provided a linear motor having a plurality of electromagnetic coils, e.g., air-core coils, ferromagnetic core coils or the like, disposed along the direction of motion, and a mover which is movable in the electromagnetic coils or the like. When the linear motor is in operation, at least one of the air-core coils, ferromagnetic core coils or the like that is located in a forward direction concerning the mover is excited to exert attraction force in a forward direction onto the mover. When a mover proceeds through the electromagnetic coil exciting, the coil stops the exciting before attraction force in a reverse direction is exerted on the mover. The mover has a length so that the magnetic poles induced from the electromagnetic coil exciting with a direct current are distant enough to eliminate the interference of the poles and to make efficient use of the magnetic flux created by the electromagnetic coil.

BRIEF DESCRIPTION OF THE DRAWINGS

FIG. 1(A), 1(B), and 1(C), are schematic views showing the attraction force and the operation of the mover 1 and the electromagnetic coils 2, e.g., air-core coils, ferromagnetic core coils or the like.

DETAILED DESCRIPTION OF THE PRESENT INVENTION

The magnetic field inside the electromagnetic coil, e.g., air core coils, ferromagnetic core coils or the like, is stronger than the magnetic field outside the coil. Therefore, a ferromagnetic body is most easily magnetized by induction due to the strong magnetic field inside the coil. When a magnetizable cylindrical tube made of a magnetic material has a rod-like shape, and one end of the element approaches the electromagnetic coil being excited, a magnetic polarity is created inside the mover due to magnetic induction so that the mover has magnetic poles at both ends. The polarity of the mover is inverse to the polarity of the magnetic field generated by the electromagnetic coil. If the mover is long enough, the attractive force acting on the mover due to the interaction of the magnetic pole on the distal end of the mover is negligibly small. Therefore by exciting the electromagnetic air-core coil in front of the mover, it is possible to give a forward attractive force to the mover. The attractive force increases gradually as the mover approaches the breech of the coil. However, the attractive force takes a maximum value when the front end of the mover is near the center of the electromagnetic coil, and the decrease gradually after the front end of the mover passes through the center of the electromagnetic coil. Further the move stops linear force when the mover and the exciting coil overlap completely. Further advance of the mover gives an attraction force in a reverse direction. Therefore, the excitation of the electromagnetic coil is stopped before the attractive force in the reverse direction is exerted on the mover. Accordingly, forward attractive force is continuously exerted on the mover by successively exciting the electromagnetic coils or the like, ferromagnetic core coils or the like when one of them comes just in front of the front end of the mover, and ending to excite the electromagnetic coil soon after the mover passes through the electromagnetic coil. Thus, a linear motor can be realized according to the above-described operation. Attractive force exerted on the mover is increased by increasing the electric current supplied to the electromagnetic coil. The attractive force is more modulated by extending the length of the mover.

Figure 2A:
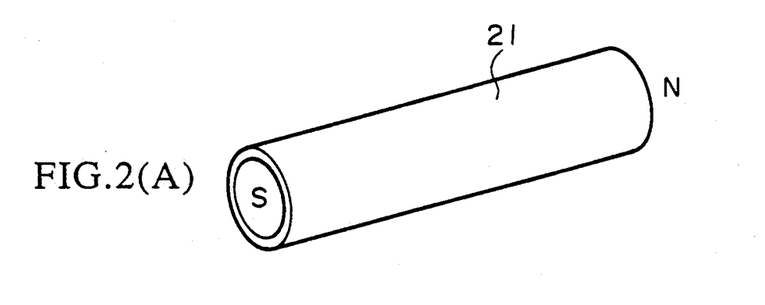
FIG. 2(A) shows an embodiment for the mover made of a ferromagnetic material.
Figure 2B:
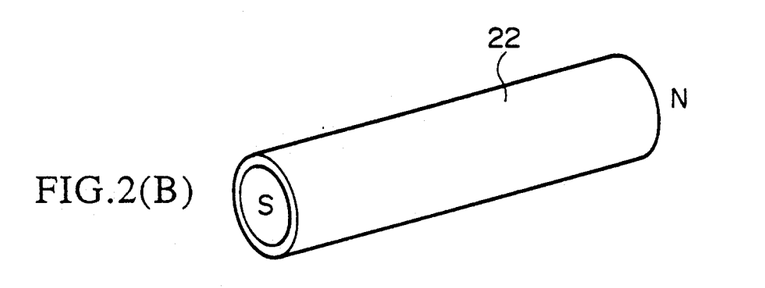
FIG. 2(B) shows an embodiment for the mover made of a permanent magnet and magnetizable cylindrical tube.
Figure 2C:
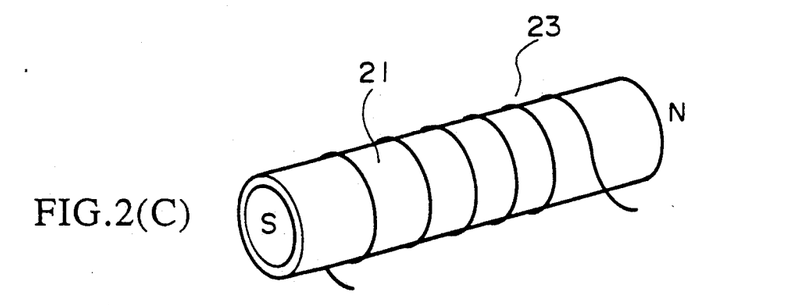
FIG. 2(C) shows an embodiment for the mover made of an electromagnet and magnetizable cylindrical tube.
Figure 2D:
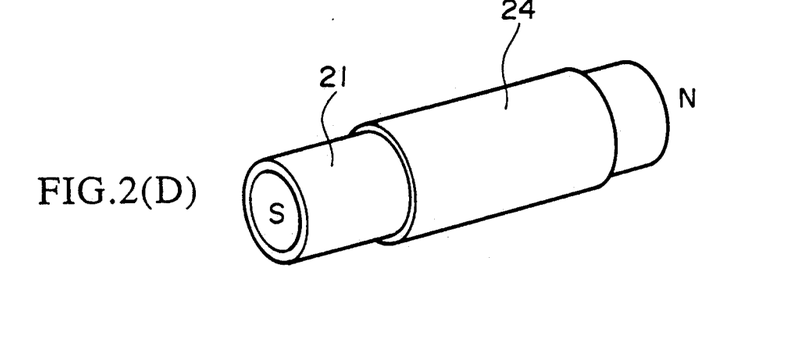
FIG. 2(D) shows an embodiment for the mover made of a superconductive magnet and magnetizable cylindrical tube.
Figure 2E:
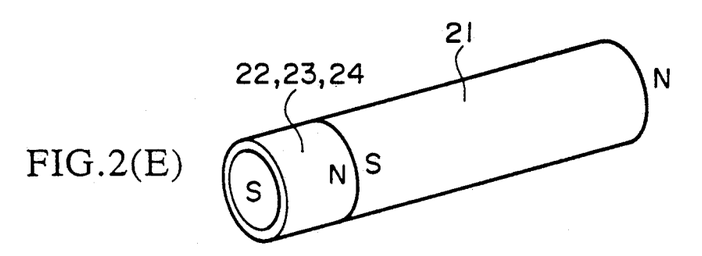
FIG. 2(E) shows an embodiment for the mover which is a hybrid magnetic body comprising magnets 22, 23, and 24 disposed on the front end of the ferromagnetic body.
Figure 2F:
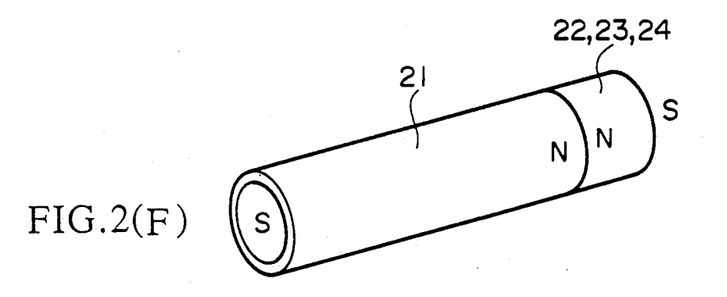
FIG. 2(F) shows an embodiment for the mover that is a hybrid magnet comprising magnets 22, 23, and 24 disposed on the rear end of a ferromagnetic body.
Figure 2G:
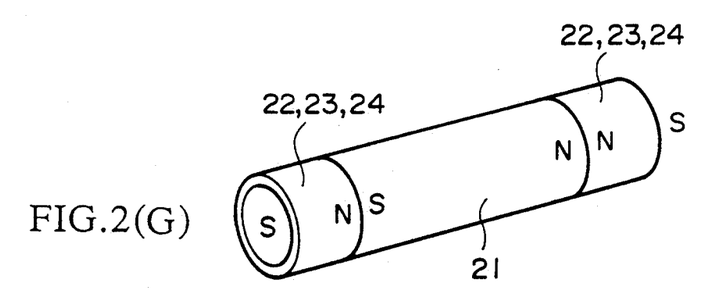
FIG. 2(G) shows an embodiment for the mover that is a hybrid magnet comprising magnets 22, 23, and 24 disposed on both ends of a ferromagnetic body.

It is possible to increase the attraction effect by attaching permanent magnets, electromagnets, or superconducting electromagnets having polarities which derive the attraction effect, that is, a polarity which derives an attraction effect at the front end and a polarity which derives a repulsive effect at the rear end, as shown in FIGS. 2(E), 2(F), and 2(G). Furthermore, it is possible to increase the attractive force by providing the mover with a permanent magnet, as shown in FIG. 2(B), an electromagnet, as shown in FIG. 2(C), or a superconducting electromagnet, as shown in FIG. 2(D).

Figure 1A:
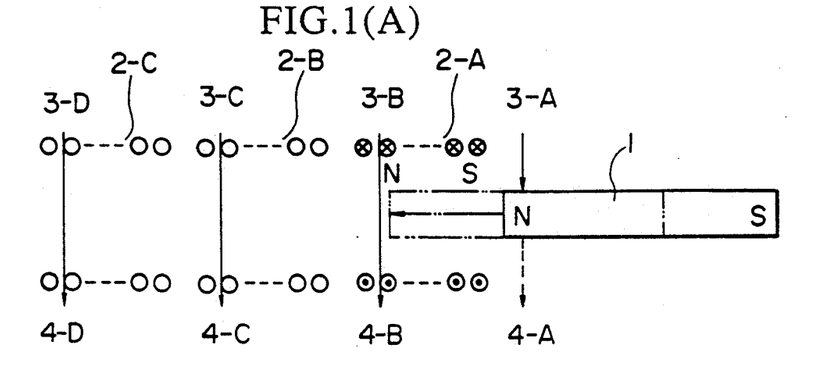
Figure 1B:
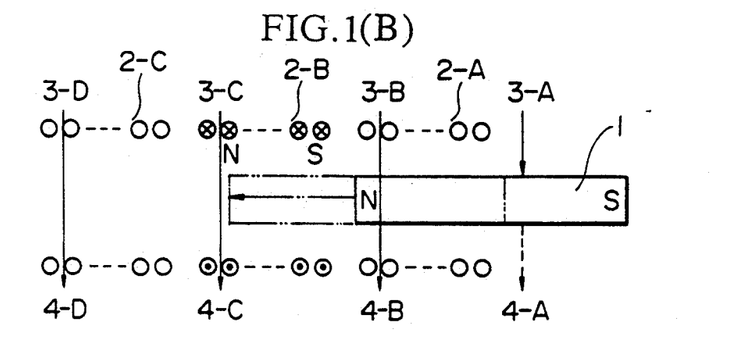
Figure 1C:
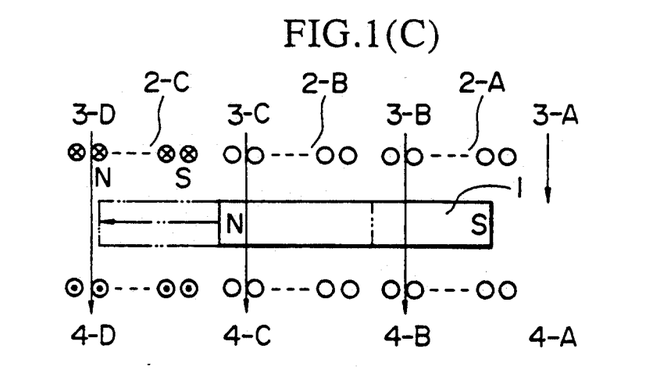

An embodiment of the linear motor according to the present invention is shown in FIGS. 1(A), 1(B), and 1(C), to depict the relationship of the attraction and the operation of the mover 1.

Figure 4:
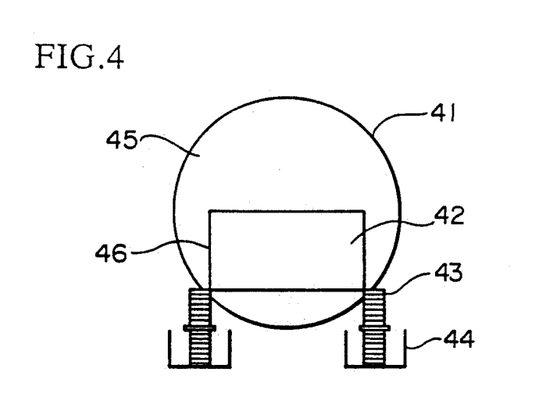
FIG. 4 is a transversal sectional view of an embodiment of the mover 1 traveling along the track and guide.

A mover 1 is disposed inside a series of electromagnetic air-core coils 2-A, 2-B, and 2-C. Transversal cross section of the system is shown in FIG. 4, wherein a mover 41, and a track and a guide for traveling 44 are shown. According to FIG. 4, the mover 41 has a cylindrical shape. A cylindrical structure with any shape may be employed. It is desirable that a shape is determined to lighten the weight and improve the heat dissipation capacity. The cylindrical mover 41 comprises a ferromagnetic material having an air circulation path 45 at an upper part thereof and a carrier 46 at a lower part. The mover 41 is carrying goods 42 loaded thereon. The mover 41, which is not a gliding boat, has wheels 43 enabling it to travel along the guide 44. In place of the electromagnetic air-core coils, another type of coils, e.g., ferromagnetic core coils or the like, can be used.

Figure 5A:
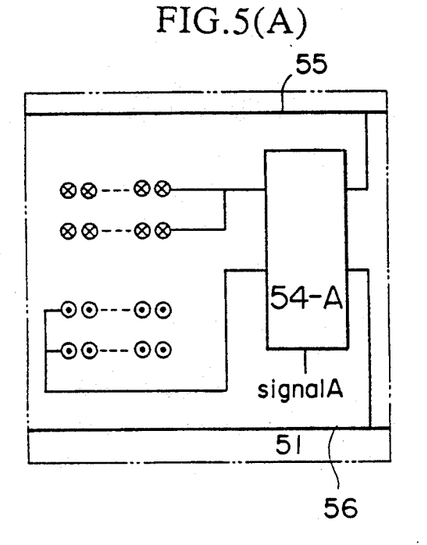
FIG. 5(A) and 5(B) are block diagrams showing exciting circuits comprising two single layer of electromagnetic coils 2-a, e.g., air-core coils, ferromagnetic core coils or the like, each of which is laid upon the other and connected in parallel to each other to be excited by direct current, a switching member with two terminals, a switching member with three terminals respectively, a positive feeder bus line, and a negative return line.
Figure 5B:
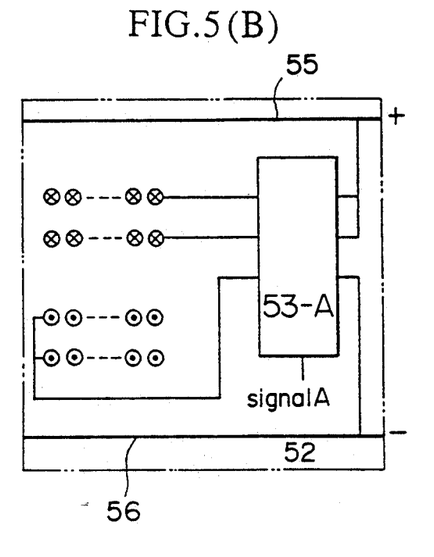

Embodiments of parallel feeder systems for supplying exciting current to the electromagnetic air-core coil 2 are shown in FIG. 5. In this figure, the electromagnetic air-core coil 2 comprises a plurality of single layer windings each of which being laid upon another. Exciting current is fed to each of the single layer windings in parallel FIG. 5(A) shows an embodiment of the parallel feeder system having an electromagnetic air-core coil 2 of two layers structure and a switching member with two terminals FIG. 5(B) shows an embodiment of the parallel feeder system having an electromagnetic air-core coil 2 of two layers structure and a switching member with three terminals. In this figure, an exciting circuit 51-A or 52-A comprises two single layer of electromagnetic air-core coils, or the like 2-A, as shown in FIG. 1, each of which is laid upon the other and connected in parallel to each other to be excited by direct current, a switching member 53-A with three terminals or a switching member 54-A with two terminals, a positive feeder bus line 55, and a negative return line 56. These figures are explanation views of the electromagnetic air-core coils, or the like 2-A which are controlled by ON or OFF according to the switching member 53-A with three terminals or switching member 54-A with two terminals. It is possible to provide a linear motor by arranging the exciting circuits A to N continuously.

In this figure, only an embodiment of two single layer of electromagnetic air-coils, or the like is indicated. However, it is possible to control ON or OFF of the electromagnetic air-coils, or the like by using coils of N layers structure for strengthening the exciting and a switching member with N or N+1 terminals.

Figure 6A:
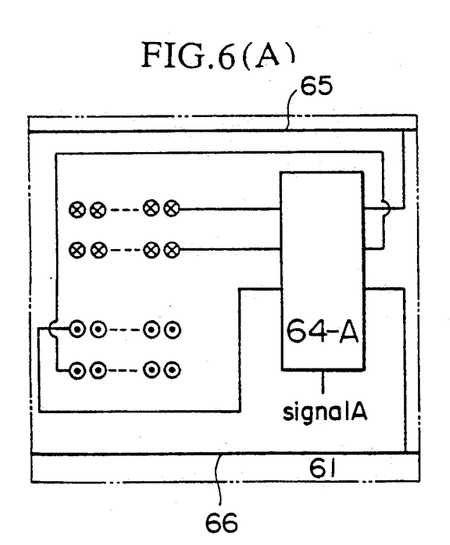
FIG. 6(A) and 6(B) are block diagrams showing exciting circuits comprising two single layer of electromagnetic coils 2-A each of which is laid upon the other and connected in series to each other to be excited by direct current, a switching member with three terminals, a positive feeder bus line, and a negative return line.
Figure 6B:
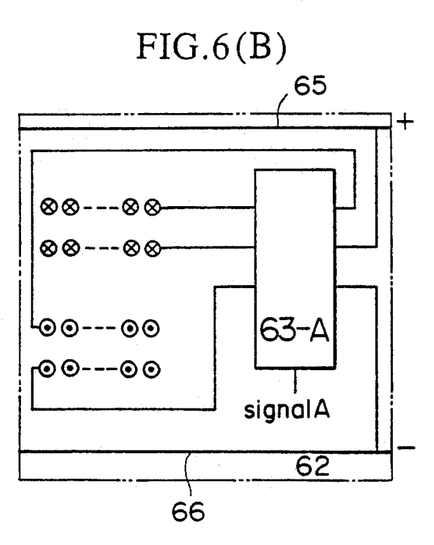

Embodiments of serial feeder systems that are means for supplying exciting current to the electromagnetic air-core coil 2 are shown in FIG. 6. In this Figure, the electromagnetic air-core coil 2 comprises a plurality of single layer windings each of which is laid upon another. Exciting current is fed to each of the single layer windings that is connected in serial. FIG. 6 shows embodiments of the serial feeder system having an electromagnetic air-core coil 2 of two layers structure and a switching member with three terminals 63, 64. FIG. 6(A) shows an embodiment having an electromagnetic air-core coil 2 wound from the inner side to the outer side. FIG. 6(B) shows an embodiment having an electromagnetic air-core coil 2 wound from the outer side to the inner side.

FIG. 6 shows an exciting circuit 61-A or 62-A comprising two single layer of electromagnetic air-core coils or the like 2-A each of which is laid upon the other and connected in series to each other to be excited by direct current, a switching member 63 and 64 with three terminals, a positive feeder bus line 65, and a negative return line 66. These figures are explanation views of the electromagnetic air-core coils or the like 2 that are controlled by ON or OFF according to the switching member 63 with three terminals. It is possible to provide a linear motor by arranging the exciting circuits A to N continuously.

In this figure, only an embodiment of two single layer of electromagnetic air-core coils or the like is indicated. However, it is possible to control ON or OFF of the electromagnetic air-core coils or the like by using coils of N layers structure for strengthening the exciting and switching member with N+1 terminals.

In FIGS. 1(A), 1(B), and 1(C), a mover 1 and N electromagnetic air-core coils or the like 2, i.e. electromagnetic coils 2-A, 2-B, and 2-C, having a length that is considered to be proper for transfer, provision, maintenance or the like thereof is coaxially arranged. A track for traveling 44 is provided in each of the electromagnetic air-core coils, or the like 2, as shown in FIG. 4. The mover 1 (41) which can travel along the guide has a container for containing carried goods 42, a gliding surface for gliding along the track and guide for traveling 44, and traveling wheels 43. In order to excite the electromagnetic air-core coils or the like 2 in a predetermined range in which the change of the attraction generated between the coils and the mover may be admitted, there are provided sensors for detecting the position of the mover 1, switching devices 53, 54, 63 and 64 (switching devices A, B, C,...N) for exciting the electromagnetic air-core coils, or the like 2 and for stopping the excitation on the basis of signal from the sensors, an exciting BUS line for supplying electric power to N exciting positive terminals of exciting circuits 51, 52, 61, and 62 (exciting circuits A, B, C, ... , N), and a return line for receiving current from N exciting negative terminals in the linear motor having a magnetostatic induction element that is movable in an electromagnetic coil.

When the top ends of the mover 1 having a large length is opposite to the entrance of the electromagnetic air-core coil 2 and the coils 2 is excited, the mover 1 is inductively magnetized like a bar magnet so that the polarity generated at the top end of the mover in the advance direction and the polarity generated at the back end are reverse to each other. However, the strengths and the generation distribution of the magnetic poles thereof are not symmetrical, so that destruction of the symmetry and the separation of the polarities derive attraction. Acceleration of the destruction of the symmetry and the separation of the polarities can strengthen the function of the magnet. For this sake, it is possible to use a mover 1 comprising a simple ferromagnetic body 21 that is not magnetized, as shown in FIG. 2(A), a permanent magnet 22 that is already magnetized, as shown in FIG. 2(B), an electromagnet 23, as shown in FIG. 2(C), or a superconducting electromagnet 24, as shown in FIG. 2(D), as the mover having an effective length. For the sake, it is possible to attach a permanent magnet 22, an electromagnet 23, a superconducting electromagnet 24 or the like to the top end surface or to the top portion of the mover 1, as shown in FIG. 2(E). Such a magnet may be attached to the rear end surface or the rear end portion of the mover 1 so that the element 1 has an effective length, as shown in FIG. 2(F). Accordingly, it is possible to weaken the reverse attraction generated near the exit of the electromagnetic air-core coil 2 and to use the magnetic field as a attractive force. Furthermore, such magnets may be attached to both the top and rear end portions of the mover 1 so that the element 1 has an effective length, so that the effects of the attractive forces are improved, as shown in FIG. 2(G).

When a mover having an effective length that provides a large separation of the polarities and N electromagnetic air-core coils or the like are coaxially arranged and the electromagnetic coil 2-A is excited, as shown in FIG. 1(A), the mover moves in the advance direction by the attraction function in the attraction function range of the coil A. However, when the mover goes out of the attraction function range of the coil A, the mover is attracted in the reverse direction. Therefore, the excitation of the coil 2-A is stopped, and next electromagnetic coil 2-B provided in the advance direction is excited to give a further advance attraction to the mover 1, as shown in FIG. 1(B). The mover moves in the advance direction in the attraction function range of the coil B. However, when the mover goes out of the attraction function range of the coil B, the mover is attracted in the reverse direction, similarly to the case of the coil A.

Therefore, the excitation of the coil 2-B is stopped, and next electromagnetic coil 2-C provided in the advance direction is excited to give a further advance attraction to the mover 1, as shown in FIG. 1(C). By repeating similar function n times, it is possible to drive the mover continuously as a linear motor, not an actuator having a limited driving range. The stop of excitation of the coil and the excitation of the next coil may be carried out when the mover is near the position where the generation of attraction in the advance direction has been out.

The switching circuit that excites the electromagnetic air-core coil or the like 2 only while attraction in the advance direction is given to the mover 1 and stops the excitation after the advance attraction is out, is controlled by receiving a switching signal from the sensors which use the specific ability of the mover 1, as shown in FIG. 1(A), 1(B), and 1(C). Each of the sensors may be a pressure sensor that detects the weight of the mover 1 itself or release from the weight, an optical sensor that uses interception of light by the existence of the mover 1 to use a signal for starting excitation of the electromagnetic coil 2, or an optical sensor that uses both interceptions of light according to passing of the top end portion of the mover 1 and reopening of light according to passing of the rear end portion thereof.

As shown in FIGS. 1(A), 1(B), and 1(C), the sensors may comprise a first set of a light emitting member 3 and a light receiving member 4 for receiving the light emitted from the light emitting member 3 each of which is provided near the final end of the advance attraction range, the first set generating an OFF signal for intercepting the exciting current to the electromagnetic air core coils or the like 2, before the reverse attraction function is generated in the advance direction, that is, before the reverse attraction function is given to the mover 1; and a second set of a light emitting member 3 and a light receiving member 4 for receiving the light emitted from the light emitting member 3 each of which is provided near the beginning end of the advance attraction range, the second set generating an ON signal for exciting the next electromagnetic coil to give a continuous advance attraction to the mover 1.

It is possible to provide the first and second sets of light emitting members 3 and light receiving members 4 separately to each other. It is also possible to provide a sensor comprising a set of light emitting member 3 and light receiving member 4 so that the sensor can generate not only an ON signal for exciting the electromagnetic air-core coil 2 but also an OFF signal for intercepting the exciting current of the excited electromagnetic air-core coils or the like 2 for rear attraction function, to derive continuous attractive force.

The latter case will be explained follows.

When light emitted from the light emitting member 3-A is intercepted by the top portion of the mover 1 and the light receiving member 4-A receives no light, an exciting signal is sent 2A the electromagnetic coil 2 2A excite the coil 2. Then, when light emitted from the light emitting member 3-B is intercepted by the top portion of the mover 1 and the light receiving member 4-B receives no light, an excitation stopping signal is sent to the electromagnetic coil 2 A to stop the excitation of the coil 2-A and an exciting signal is sent to the electromagnetic coil 2-B to excite the coil 2-B. Thereafter, coils following the electromagnetic coil 2 C are excited and stopped repeatedly, similarly to the electromagnetic coil 2-A or 2-B, so that the mover 1 can be continuously moved.

When the mover 1 moves in a changing magnetic field in a direction to the magnetic field, cylindrical electric fields are produced around the center axis of the mover 1. Therefore, when the mover 1 has electric conductivity, electric current is induced to heat up the mover 1. In order to prevent the problem, a slit 31 is provided in the mover 1 in a direction parallel to the advance direction, as shown in FIG. 3.

Figure 3:
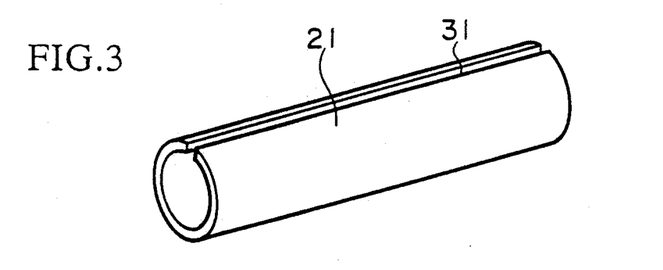
FIG. 3 is a view showing a mover having a longitudinal slit.

In order to prevent the problem, a slit 31 is provided in the mover 1 in a direction parallel to the advance direction, as shown in FIG. 3.

Figure 7:
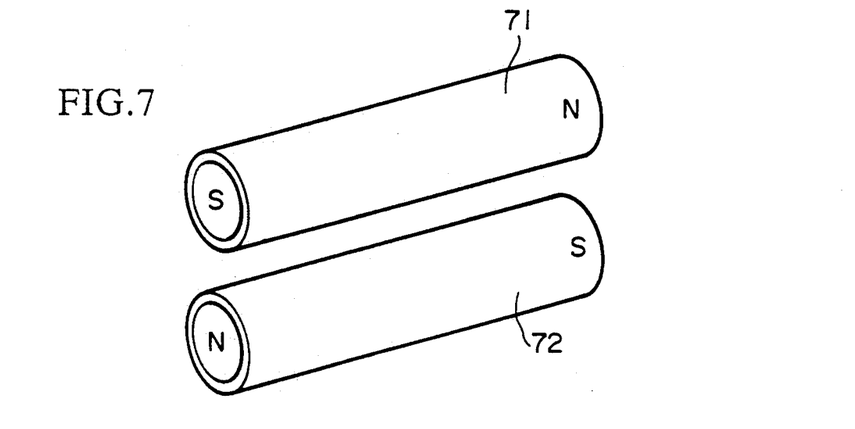
FIG. 7 is a view showing an embodiment of the arrangement of the electromagnetic coils, e.g., air-core coils, ferromagnetic core coils or the like, for the up and down lines.

FIG. 7 shows an embodiment of the arrangement of the electromagnetic air-core coils or the like when the mover 1 may be transferred on an up line 71 and a down line 72 in parallel. The electromagnetic air-core coils or the like 2 for the up and down lines are arranged so that the excited coils are attracted to each other. The arrangement can prevent the electromagnetic coils rolling down and suppress generation of external leakage magnetic field, in comparison with the reverse arrangement to give a attractive force to each other.

When the motion of the mover 1 is in both directions of the up and down lines 71, 72, the exciting of the electromagnetic air-core coils or the like 2 for the motion of the mover 1 may be controlled, so that the magnetization of the mover 1 is eliminated by changing the top end portion of the mover 1 in the travel on one of the up and down lines 71 and 72 to the rear end portion thereof in the travel on the other of the lines 71 and 72.

When the motion of the mover 1 is in both directions of the up and down lines, the exciting of the electromagnetic air-core coils or the like 2 for the motion of the mover 1 may be controlled so that the magnetization of the mover 1 is increased by setting the magnetizing direction of the rear end portion of the mover 1 in the travel on one of the lines 71 and 72 being the same as that of the top end portions of the mover 1 in the previous travel.

Figure 8:
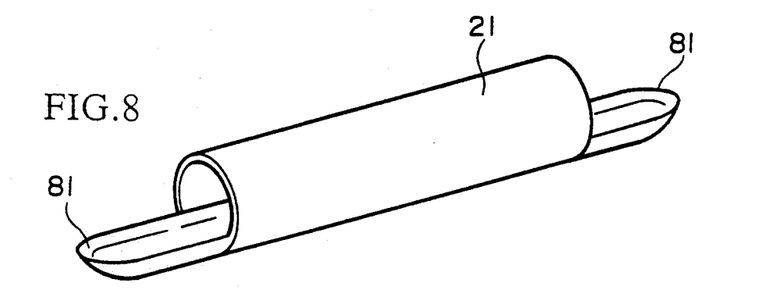
FIG. 8 is a view showing a cylindrical mover having cone shaped front and rear portions.
Figure 9:
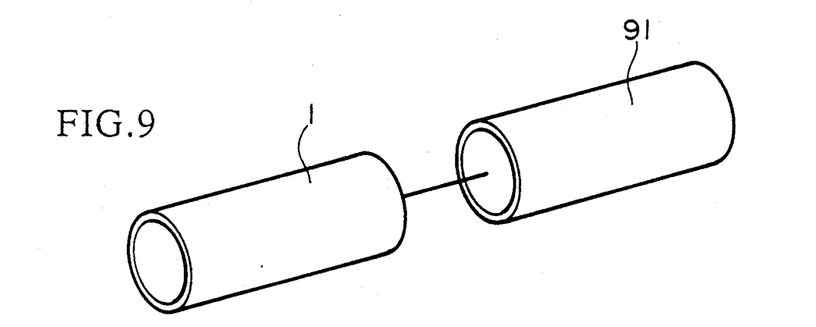
FIG. 9 is a view showing an embodiment in which the mover is connected with a movable body to give attraction to the movable body.

FIG. 8 shows an embodiment of the mover 1 having top end and rear end portions of cone shapes 81 to reduce the running drag of lower part and upper cylindrical part and to derive attraction function due to magnetic field, in a movable body that comprises a ferromagnetic material 21 and has a traveling air circulation path in the upper part of the mover 13. The shape of the movable body, i.e., the mover 1 is no limited to a cylindrical one When the magnetic field generated in the electromagnetic air-core coils or the like 2 may have an influence upon carried goods placed on the inside of the mover 1, the linear motor can be drive so that the mover is separated from the movable body 91 carrying a carried good 14, as shown in FIG. 9.

In this case, at least one of the mover 1 and the movable body 91 may have a longitudinal slit with a depth from the surface to the center axis thereof for preventing generation of peripheral current, similarly to the mover 1 as shown in FIG. 3. The peripheral current is induced to flow on the periphery of the circular section of the mover or the mover when the movers in the electromagnetic air-core coils or the like with not uniform distribution to magnetic field.

In the above described embodiment, only a linear motor system comprises a plurality of air-core coils or the like provided on the ground and a magnetostatic induction element provided on a mover has been explained. However, the linear motor system can comprise a magnetostatic induction element provided on the ground and a plurality of coils provided on a mover.

The shape of the magnetostatic induction element may be not only a cylindrical one but also a hollow with any shape of a vertical section, e.g., a triangular or rectangular shape section.

The magnetostatic induction element is an elongated object which may be hollow or solid. However, the magnetostatic induction element is preferable to be hollow in order to obtain linear driving force effectively resulting from the interaction between the magnetostatic induction element and the electromagnetic coils The shape of the air-core coils or the like may be not only a cylindrical one but also a hollow with any shape of a vertical section, e.g., a triangular or square shape section.

As described above, according to the linear magnetization mover motor of the present invention, which can be driven due to linear force resulting from the interaction between a magnetostatic induction element and electromagnetic coils, it is possible to use the magnetic field generated by the electromagnetic coil very effectively in comparison with a conventional method, since a higher area in the magnetic field generated by excitation of the electromagnetic coils 2 is used. Therefore, the mover 1 comprising only a simple ferromagnetic material 21 can be a high-powered induction magnet. Accordingly, it is possible to derive a large attraction to use the linear motor for industry widely.

What is claimed is:

1. A DC linear magnetization mover motor for creating linear force resulting from the interaction between magnetostatic induction element and an electromagnetic coil comprising:

a plurality of electromagnetic coils disposed in line; and a magnetostatic induction element supported so as to be relatively movable through the electromagnetic coils, wherein the electromagnetic coils are selectively excited so that a magnetic field created by the excited coils exerts a forward attractive force on the magnetostatic induction element, and the magnetostatic induction element has a length sufficient to substantially exclude interference from magnetic poles created by induction.

2. A linear motor as claimed in claim 1, wherein each of the electromagnetic coils is an air-core coil.

3. A linear motor as claimed in claim 1, wherein the electromagnetic coils are provided on the ground.

4. A linear motor as claimed in claim 1, wherein the magnetostatic induction element is provided on the ground.

5. A linear motor as claimed in claim 1, wherein the magnetostatic induction element comprises a rod shaped magnetic member magnetizable by induction due to a magnetic field created by the electromagnetic coils.

6. A linear motor as claimed in claim 1, wherein the magnetostatic induction element is propelled continuously through said plurality of electromagnetic coils by electromagnetic attraction generated in the magnetostatic induction element due to the electromagnetic coil.

7. A linear motor as claimed in claim 6, wherein the electromagnetic coil is excited while the excitation thereof exerts forward attractive force to the magnetostatic induction element, and the excitation is stopped before the excitation thereof exerts reverse attraction force on the magnetostatic induction element.

8. A linear motor as claimed in claim 6, wherein the electromagnetic coil is excited while the magnetostatic induction element is approaching the electromagnetic coil, and the excitation of the electromagnetic coil is stopped while the magnetostatic induction element is receding the electromagnetic coil.

9. A linear motor as claimed in claim 7, wherein the electromagnetic coil is excited while the magnetostatic induction element is in the vicinity thereof.

10. A linear motor as claimed in claim 1, wherein the magnetostatic induction element comprises a hollow magnetic member.

11. A linear motor as claimed in claim 1, wherein the magnetostatic induction element comprises a solid magnetic member.

12. A linear motor comprising:

a plurality of electromagnetic coils disposed in line; and a magnetostatic induction element supported so as to be relatively movable through the electromagnetic coils, wherein the electromagnetic coils are selectively excited so that a magnetic field created by the excited coils exerts a forward attractive force on the magnetostatic induction element, and the magnetostatic induction element has a length sufficient to substantially exclude interference from magnetic poles created by induction, wherein the movable magnetostatic induction element separates a conveying carrier as a locomotive separates a train car to avoid the damage effect of he magnetic field when a goods included in the movable magnetostatic induction element has a damage from the magnetic field.

13. A linear motor as claimed in claims 1, wherein at least one of the magnetostatic induction element and the movable member has a longitudinal slit for preventing generation of loop eddy current and for having more flatter characteristic of force than that of the solid or hollow movable magnetostatic induction element without the longitudinal slit.

14. A linear motor as claimed in claims 1, wherein a plurality of consecutive electromagnetic coils are active simultaneously.

15. A linear motor as claimed in claims 1, wherein the linear motor further comprises a switching means which has N+1 terminals for switching N electromagnetic coils and a feeder circuit.

16. A linear motor as claimed in claims 7, wherein the linear motor further comprises a switching means which has N+1 terminals for switching N electromagnetic coils and a feeder circuit.

17. A linear motor as claimed in claims 8, wherein the linear motor further comprises a switching means which has N+1 terminals for switching N electromagnetic coils and a feeder circuit.

18. A DC linear magnetization mover motor as claimed in claim 1, wherein the length of said magnetostatic induction element is greater than that or the excited electromagnetic coil.

19. A DC linear magnetization mover motor for creating linear force resulting from the interaction between a magnetostatic induction element and an electromagnetic coil comprising:

a plurality of electromagnetic coils disposed in line; and a magnetostatic induction element supported so as to be relatively movable through the electromagnetic coils, the magnetostatic induction element being cylindrical and having a slit along the axial direction thereof, wherein the electromagnetic coils are selectively excited so that magnetic field created by the excited coil exert forward attractive force to the magnetostatic induction element, and the magnetostatic induction element has a length larger than that of the excited coil.

20. A DC linear magnetization mover motor for creating linear force resulting from the interaction between magnetostatic induction element and electromagnetic coil comprising:

a plurality of electromagnetic coils disposed in line; and a magnetostatic induction element supported so as to be relatively movable through the electromagnetic coils;

wherein the electromagnetic coils are selectively excited so that a magnetic field created by the excited coil exerts a forward attractive force on the magnetostatic induction element, and the induction element has a length sufficient to substantially exclude the interference between a forward attractive force defined by the product of the excited magnetic field at the front portion of the induction element and magnetic poles induced on the front portion of the induction element, and a backward repulsive force defined by the product of the excited magnetic field at the back portion of the induction element and magnetic poles induced on the back portion of the induction element.

21. A DC linear magnetization mover motor as claimed in claim 1, wherein the forward attractive force exerted on the magnetostatic induction element is generated by an interaction between the radial component of magnetic field density by the excited coil and a coaxial magnetostatic induced magnetizing current equivalent to magnetic poles in the induction element.

* * * * *

UNITED STATES PATENT AND TRADEMARK OFFICE
CERTIFICATE OF CORRECTION

PATENT NO. : 5,302,872
DATED : April 12, 1994
INVENTOR(S) : Yasutsugu Ohki et al.

It is certified that error appears in the above-indentified patent and that said Letters Patent is hereby corrected as shown below:

Claim 12, Column 11, Line 7, change "he" to --the--. *

Claim 12, Column 11, Line 7, delete "a"

Claim 12, Column 11, Line 8, delete "a".

Claim 13, Column 11, Line 10, change "claims" to --claim--.

Claim 14, Column 11, Line 17, change "claims" to --claim--.

Claim 15, Column 11, Line 20, change "claims" to --claim--.

Claim 16, Column 11, Line 24, change "claims" to --claim--.

UNITED STATES PATENT AND TRADEMARK OFFICE
CERTIFICATE OF CORRECTION

PATENT NO. : 5,302,872
DATED : April 12, 1994
INVENTOR(S) : Yasutsugu Ohki et al.

It is certified that error appears in the above-indentified patent and that said Letters Patent is hereby corrected as shown below:

Claim 17, Column 11, Line 28, change "claims" to --claim--.

Claim 18, Column 11, Line 34, change "or" to --of--. *

Claim 19, Column, 12, Line 8, change "exert" to --exerts--.

Signed and Sealed this

Twenty-seventh Day of December, 1994

Attest:

BRUCE LEHMAN

*Attesting Officer*   *Commissioner of Patents and Trademarks*